Oct. 19, 1937.  W. F. GOFF  2,096,101
VALVE STEM
Filed Dec. 12, 1934

INVENTOR.
WILLIAM F. GOFF
BY Kwis, Hudson & Kent
ATTORNEYS

Patented Oct. 19, 1937

2,096,101

UNITED STATES PATENT OFFICE 2,096,101

VALVE STEM

William F. Goff, Akron, Ohio, assignor to The Dill Manufacturing Company, Cleveland, Ohio, a corporation of Ohio Application December 12, 1934, Serial No. 757,189

4 Claims. (Cl. 152—12)

This invention relates to a valve stem such as is used with the inner tube of a pneumatic tire.

An object of the invention is to provide a valve stem which is so formed that the base portion and the stem portion of the valve stem are separable, wherefore, tire tubes can be equipped with only the base portion which is standard for all tubes, while a stem portion of suitable length or shape can be applied to the base portion as required.

Another object is to provide a valve stem such as specified in the above mentioned object and wherein the base portion of the valve stem is permanently connected to the tire tube, as, for example, by being vulcanized thereto.

Another object is to provide a valve stem wherein the base portion is formed of rubber and has an outwardly extending short spud portion upon which is swivelly mounted a metallic sleeve that acts to secure the stem proper to the base and which will also, when the tube and stem are mounted upon a vehicle wheel, be located in the rim opening and serve to center the stem in the opening and to protect the spud of the base portion from injury by the edge of the opening.

A further object is to provide a valve stem such as specified above which is simple in construction and can be readily assembled and disassembled.

Further and additional objects and advantages will become apparent hereinafter during the detailed description that is to follow of an embodiment of the invention which is illustrated in the accompanying drawing, wherein Fig. 1 is a view partly in section and partly in elevation, the tire tube, base portion of the stem, and metallic connecting sleeve being shown in section, while the stem proper is shown in elevation, it being noted that the connecting sleeve is illustrated as removed from the spud in order that the construction of the latter and the manner in which the inner end of the stem proper cooperates therewith can be clearly seen.

Figure 1:
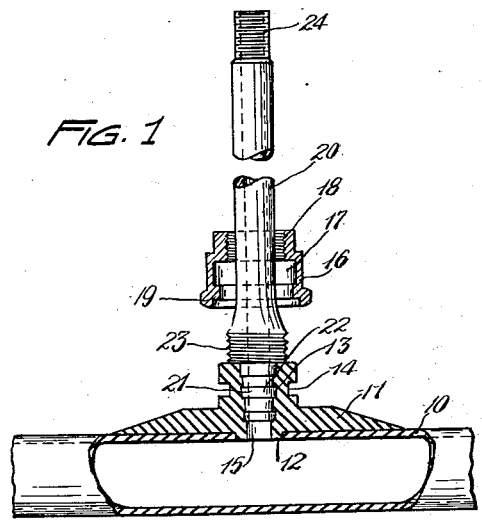
Figure 2:
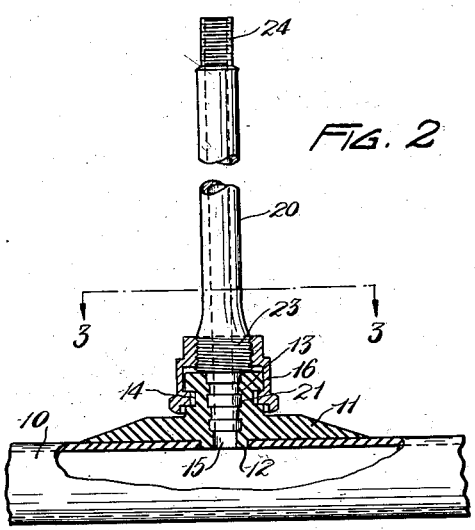
Fig. 2 is a view similar to Fig. 1, but shows the connecting sleeve mounted in position upon the spud and threadedly connected to the stem proper.
Figure 3:
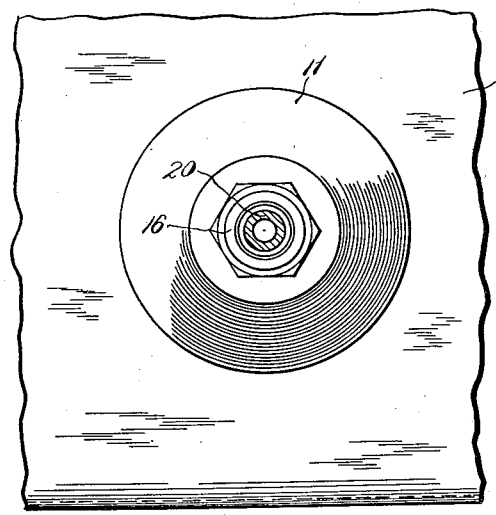
Fig. 3 is a sectional view taken substantially on line 3—3 of Fig. 2.
Figure 4:
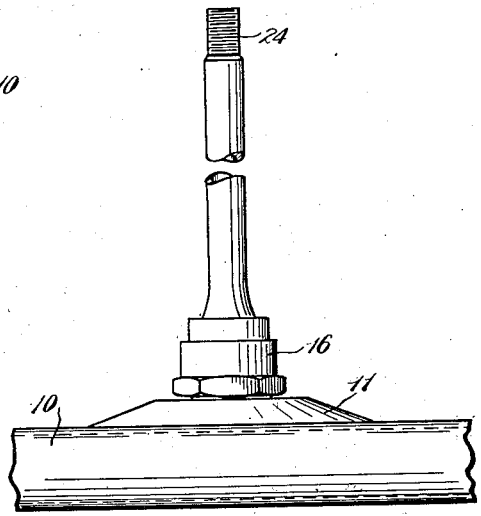
Fig. 4 is an elevational view of a valve stem connected to a tire tube.

In the drawing a portion of an inner tube of a pneumatic tire is indicated at 10, said tube being shown in an uninflated condition. The valve stem embodying the present invention comprises a base 11, preferably in the form of a circular rubber patch-like member having a thickened central portion and a tapered portion lying outwardly of the central portion and including the periphery of the base. The patch preferably is applied to the outer surface of the tube and is vulcanized thereto, the inner flat side of the patch engaging the outer surface of the tube, while at the center of the patch on the inner side thereof there is located a projecting portion 12 of a length substantially corresponding to the thickness of the tube and extending into and filling an opening in the tube when the base portion is secured to the latter. The base 11 has extending from the outer side of the thickened central portion an integral spud-like portion 13 provided intermediate its ends with an annular groove 14.

The spud 13 is relatively short in length while the base 11 is provided with a bore 15 extending from the inner end of the projection 12 through the base to the outer end of the spud 13. A metal connecting member or sleeve 16 is provided with a counterbore 17 that fits over the spud 13, while outwardly of the counterbore is a reduced threaded bore 18. The counterbore 17 is of such size that the spud 13 can be received therein, while an annular rib 19 projecting into the counterbore 17 engages in the annular groove 14 of the spud and swivelly connects the member and spud together. It is proposed that tire tubes be equipped with the base 11 and the member 16 that is swivelly connected to the spud 13 of the base, while the stem proper of the valve stem construction can be selected in accordance with the demands of each installation, that is, a long or a short stem or a straight or curved stem may be used depending upon the type of wheel upon which the tube is mounted. The advantages of this arrangement will be apparent since it will be possible to equip the tubes with a standard form of base, while the dealers will only need to carry a variety of stems from which the correct stem for each installation can be selected.

In the accompanying drawing the stem proper is indicated at 20 and is shown as a relatively long straight stem, it being understood, of course, that the stem 20 could be short or that it could be curved, as the case may be. The lower end of the stem 20 is provided with a reduced tapered portion 21 having a plurality of circular outwardly extending teeth-like ribs 22. Just above the reduced tapered portion 21 the stem is provided with an enlarged externally threaded portion 23 of a size to screw into the threaded bore 18 of the member 16. The stem 20, of course, is provided with a bore extending therethrough and having means for receiving the usual valve insides while the outer end of the stem 20 has a reduced threaded nipple 24 for receiving a valve cap, pump coupling, or similar member, as will be well understood.

When the stem 20 is to be secured to the base 11 the reduced tapered portion 21 of the stem is passed through the member 16 and into the bore 15 in the spud 13. The stem 20 is then forced inwardly until the portion 21 is fully received within the bore 15 and the shoulder formed by the enlarged externally threaded portion 21 of the stem is in engagement with the outer end of the spud. Inasmuch as the portion 21 is tapered it will have a tight fit within the bore 15 and the annular ribs or teeth 22 will dig into the material of the spud and form a tight seal therewith. In applying the stem 20 to the base it is understood that the stem preferably is forced inwardly to cause the portion 21 to pass into the bore 15 by relatively rotating the stem and member 16 so that the enlarged externally threaded portion 23 of the stem will screw into the threaded bore 18 of the member which preferably is in position on the spud, it being noted that the member 16 is provided with suitable wrench engaging surfaces. When the stem has been fully assembled upon the base an air-tight seal will be perfected between the portion 21 and the spud, while the engagement of the shoulder at the inner end of the enlarged portion of the stem with the outer end of the spud effects a further seal against the escape of air except through the bore of the stem.

The construction just described provides a simple yet effective and strong connection between the stem and base and one wherein there is small likelihood of air leakage occurring. The connecting member or sleeve 16 not only forms part of the connection between the stem and base, but, as will be understood, said member, when the tube is mounted upon a vehicle wheel, will extend into the rim opening and act to maintain the stem in alignment and to protect the same against wear and twisting of the stem in the rim opening. The valve stem construction is also of such character that the use of the usual spreader plate for clamping the tire tube between it and the conventional stem base is eliminated which fact constitutes an advantage of importance.

Although a preferred embodiment of the invention has been illustrated and described herein, it should be understood that the invention is susceptible of various modifications and adaptations within the scope of the appended claims.

Having thus described my invention, I claim:

1. A valve stem construction comprising a rubber base adapted to be secured to a tire tube and having an outwardly extending spud and provided with a bore extending through it and said spud, said spud being provided intermediate its ends with an annular groove, a metal connecting member having a counterbore fitting said spud and provided with an annular rib engaging in said annular groove, said connecting member being provided with a threaded bore adjacent its outer end, a detachable tubular metal stem having a portion tapered toward the inner end of the member and tightly fitting the bore in said spud, and an enlarged threaded portion outwardly of said tapered portion screwed into the threaded bore of said connecting member, the inner side of the enlarged threaded portion of the stem forming a shoulder engaging the outer end of the spud.

2. A valve stem construction comprising a rubber base adapted to be secured to a tire tube and having an outwardly extending spud and provided with a bore extending through it and through said spud, a connecting member arranged upon said spud, said connecting member and said spud having interlocking portions forming a swivel connection therebetween, and a detachable tubular metal stem having a portion interfitting the bore in said spud and another portion engaging the outer end of said spud and detachably secured to said connecting member.

3. A valve stem construction comprising a rubber base adapted to be secured to a tire tube and having an outwardly extending spud and provided with a bore extending through it and said spud, said spud being provided intermediate its ends with an annular groove, a connecting member having a counterbore fitting said spud and provided with an annular rib engaging in said annular groove, said connecting member being provided with a threaded bore adjacent its outer end, a detachable tubular stem having at its inner end a portion of such size as to have tight bore engagement in said spud, and an enlarged threaded portion outwardly of said first named portion screwed into the threaded bore of said connecting member, the inner side of the enlarged threaded portion of the stem forming a shoulder engaging the outer end of the spud.

4. A valve stem construction comprising a rubber base adapted to be secured to a tire tube and having an outwardly extending spud and provided with a bore extending through it and said spud, a connecting member having a counterbore fitting said spud and provided with a threaded bore adjacent its outer end, said spud and said counterbore being provided with interlocking portions maintaining said member and spud against relative endwise movement while permitting relative rotation therebetween, and a detachable tubular stem having an end portion of a size and shape to have tight bore engagement in said spud and a threaded portion to screw into the threaded bore of said member, whereby said member and stem may be relatively rotated to force the end portion of the latter into the bore of the spud.

WILLIAM F. GOFF.